Dec. 8, 1925. 1,565,088
J. O. GARGAN
CONDENSER
Filed Sept. 22, 1922
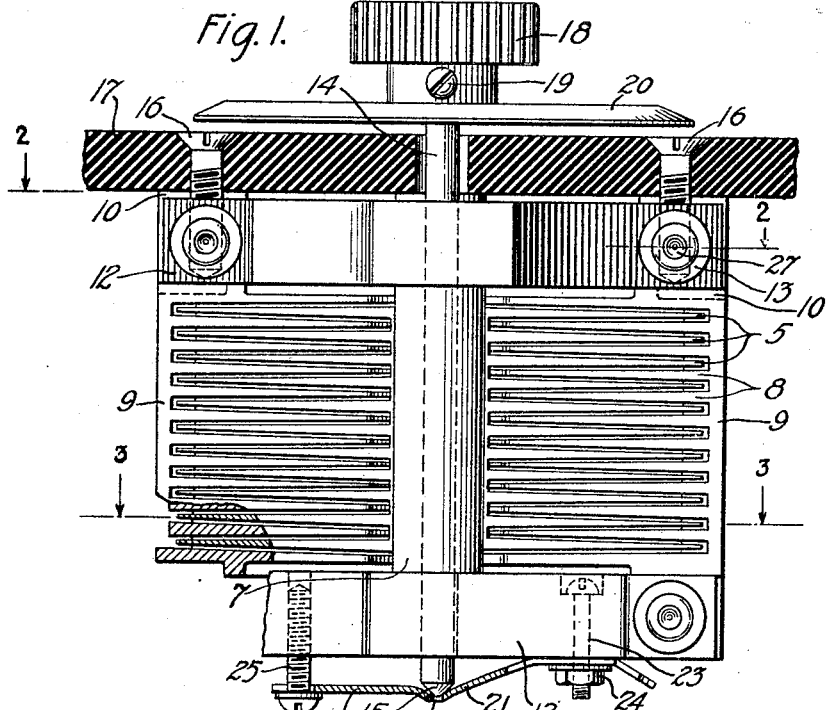
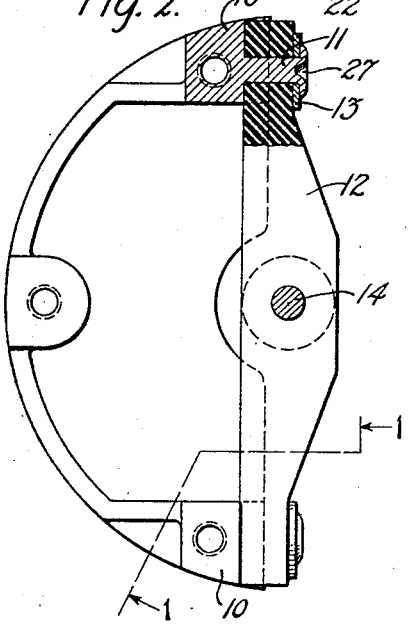
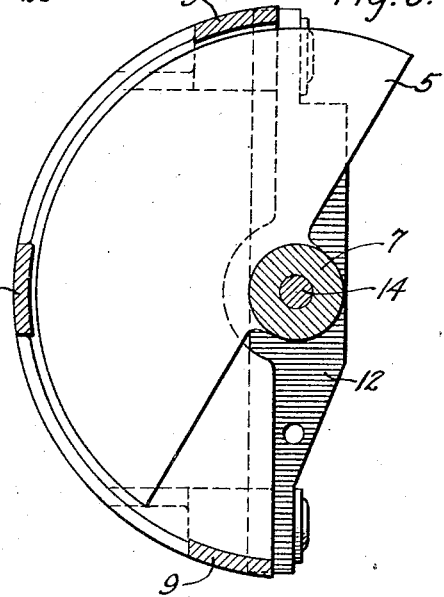
Inventor:
John O. Gargan.
by Joel C. H. Palmer
Att'y.

Patented Dec. 8, 1925.

1,565,088

UNITED STATES PATENT OFFICE.

JOHN O. GARGAN, OF BROOKLYN, NEW YORK, ASSIGNOR TO WESTERN ELECTRIC COMPANY, INCORPORATED, OF NEW YORK, N. Y., A CORPORATION OF NEW YORK.

CONDENSER.

Application filed September 22, 1922. Serial No. 589,735.

*To all whom it may concern:*

Be it known that I, JOHN O. GARGAN, a citizen of the United States, residing at Brooklyn, in the county of Kings, State of New York, have invented certain new and useful Improvements in Condensers, of which the following is a full, clear, concise, and exact description.

This invention relates to condensers of the air type and its object is to provide a condenser of this type in which the rotating member and fixed member may be quickly and easily assembled, these parts remaining in adjustment when placed in service.

In accordance with a feature of the invention it is proposed to die-cast the movable member and the fixed member and to provide the fixed member with means whereby bearing brackets or supports may be quickly mounted thereon and without necessitating the use of tapped holes. In accordance with another feature of the invention, means are provided to prevent any back-lash, whether caused by initial loose-fitting of the parts or by wear, due to constant operation.

These and other features of the invention may be more clearly understood by reference to the attached drawing in which Fig. 1 is a side elevation of a condenser constructed in accordance with the features of this invention. Fig. 2 is a view, partly in section, taken along the line 2—2 of Fig. 1, and Fig. 3 is a view, partly in section, taken along the line 3—3 of Fig. 1.

Referring to the drawing, there is provided a movable member consisting of plates 5—5 integral with a hub portion 7; and a fixed member comprising plates 8—8 securely held in position by means of columns 9—9 cast integral therewith. The outer columns 9—9 are provided with lugs 10—10 in which are cast stud members 11—11. These studs are properly dimensioned to permit their being inserted through perforations in bridge members 12—12 and the ends of the studs are then spun over washers 13—13 to secure the bridge members rigidly in position against the fixed member. The center of each bridge member 12 is provided with a perforation 14 that serves as a bearing for the shaft 15 which is preferably cast as an insert in the hub 7, but which may be attached securely thereto by any other suitable means. The bridge members are composed of an insulating material, such as hard rubber or phenol fibre.

The upper lug extensions 10—10 in addition to serving as supports for the bridge member, also serve as mounting lugs for the condenser and for that purpose are provided with threaded openings to receive the screws 16—16 which serve to mount the condenser on a panel 17. To facilitate rotating the movable member, the knob 18 is attached to the shaft by means of a set screw 19 and a dial 20 is provided to indicate the relative position of the rotatable member.

The lower end of shaft 15 is tapered as shown and engages with a cup-shaped portion 21 in the spring member 22. This spring member is rigidly secured to the lower bridge by means of bolt 23 and nut 24, the bolt passing through a suitable opening in the bridge member. The free end of spring 22 is forked and cooperates with the adjusting screw 25 to exert the desired pressure on the end of shaft 14, thus forcing the tubular shaft portion firmly against the lower portion of upper bridge 12. In case there is play in the shaft bearing, whether caused by initial loose fitting or wear in the bridge members 12 as the result of movement of shaft 15, the spring member 22, due to the cup-shaped portion bearing against the conical end of the shaft, will maintain the shaft in alignment and prevent any false positioning of the movable plates or back-lash. The spring member 22 is provided with a small perforation 26 to permit the escape of any dust due to wear of the parts.

The above described method of providing a bearing support for the movable member permits very rapid assembling of the parts and also provides a structure which when once assembled, is permanent in adjustment. The studs 11 are die-cast accurately to size and if desired may be provided with slight recesses 27 to facilitate spinning the ends over to secure the bridge member in place.

With this construction no drilling or tapping is required in the metal parts other

What is claimed is:

1. An air condenser comprising a fixed member including a plurality of parallel plates, supporting lugs and mounting studs cast integral, a movable member including a shaft portion and a plurality of parallel plates cast integral therewith, and a plurality of bridging members serving as bearings for said shaft portion and having perforations in the ends thereof adapted to cooperate with said studs whereby the bridging members may be rigidly secured to the fixed member.

2. An air condenser comprising a fixed member including a plurality of semi-circular plates having supporting lugs and mounting studs cast integral therewith, a movable member having a plurality of parallel plates adapted upon rotation to cooperate with said fixed plates, and a pair of insulating members bridged across the diameter of the fixed member and secured thereto by means of the studs of the fixed member.

3. An air condenser comprising a fixed member having a series of parallel plates, a movable member including a shaft having a tapered end and a corresponding series of parallel plates adapted to be rotated into operable relation with the plates of said fixed member, bridging members secured to said fixed member and serving as bearings for the movable member, and a spring member having a cup-shaped portion adapted to bear against the conical end of the shaft to correctly position the same.

4. An air condenser comprising a fixed member having a series of parallel plates, a movable member including a shaft having a corresponding series of parallel plates adapted to be rotated in operable relation with the plates of the fixed member and having a tapered end, bridging members secured to said fixed member and serving as bearings for the movable member, and a spring member having a cup-shaped portion adapted to bear against the tapered end of the shaft to maintain the shaft in correct alignment and having an opening in said cup to assist in maintaining the shaft in correct alignment and allow the escape of dust from said cup.

In witness whereof, I hereunto subscribe my name this 20th day of September A. D., 1922.

JOHN O. GARGAN.